US012048896B2

(12) United States Patent
Gilbert et al.

(10) Patent No.: US 12,048,896 B2
(45) Date of Patent: Jul. 30, 2024

(54) CROSSFLOW FILTER DEVICE

(71) Applicant: Sartorius Stedim Lab Limited, Stonehouse (GB)

(72) Inventors: Adam Gilbert, Bristol (GB); Martin Purshouse, Clevedon (GB); Michael Bates, Stroud (GB); Chris Biddell, Stonehouse (GB); Adam Green, Stonehouse (GB); Thomas Davidson, Stonehouse (GB)

(73) Assignee: Sartorius Stedim Lab Limited, Stonehouse (GB)

( * ) Notice: Subject to any disclaimer, the term of this patent is extended or adjusted under 35 U.S.C. 154(b) by 391 days.

(21) Appl. No.: 17/426,582

(22) PCT Filed: Feb. 18, 2020

(86) PCT No.: PCT/EP2020/054265
§ 371 (c)(1),
(2) Date: Jul. 28, 2021

(87) PCT Pub. No.: WO2020/173762
PCT Pub. Date: Sep. 3, 2020

(65) Prior Publication Data
US 2022/0161198 A1 May 26, 2022

(30) Foreign Application Priority Data
Feb. 26, 2019 (EP) .................................... 19159491

(51) Int. Cl.
*B01D 63/08* (2006.01)
*B01D 65/00* (2006.01)

(52) U.S. Cl.
CPC ......... *B01D 63/087* (2013.01); *B01D 65/003* (2013.01); *B01D 2313/041* (2022.08); *B01D 2313/086* (2013.01); *B01D 2315/10* (2013.01)

(58) Field of Classification Search
CPC ............ B01D 2313/04; B01D 2313/08; B01D 2313/086; B01D 2313/143
See application file for complete search history.

(56) References Cited

U.S. PATENT DOCUMENTS

| 4,025,425 A | * | 5/1977 | Croopnick | ............. | B01D 63/16 |
| | | | | | 210/651 |
| 4,597,868 A | | 7/1986 | Watanabe | | |

(Continued)

FOREIGN PATENT DOCUMENTS

| JP | S59-035631 | 2/1982 |
| JP | 2003126864 | 5/2003 |

OTHER PUBLICATIONS

International Search Report and Written Opinion, International Application No. PCT/EP2020/054265, dated Apr. 9, 2020, 17 pages.

(Continued)

*Primary Examiner* — Bradley R Spies
(74) *Attorney, Agent, or Firm* — Quarles & Brady LLP (57) ABSTRACT

A crossflow filter device for filtering a pressurised feed liquid is provided. The crossflow filter device comprises: a filter membrane; a flow channel for the pressurised feed liquid which extends in a path over a retentate surface of the membrane such that the direction of flow in the channel is tangential to the retentate surface, and a filtrate derived from the feed liquid passes through the membrane leaving retentate liquid in the flow channel; and a collection chamber for the filtrate formed on an opposite, filtrate surface of the membrane. The crossflow filter device further comprises a sealed housing having a retentate side and a filtrate side which enclose therebetween the flow channel, the filter membrane and the collection chamber. The crossflow filter device further comprises, flow channel guide walls provided at an inner surface of the retentate side of the housing. The guide walls are configured to form a fluid tight seal with the (Continued)

filter membrane, and thereby define the path of the flow channel over the retentate surface of the membrane.

13 Claims, 10 Drawing Sheets

(56) References Cited

U.S. PATENT DOCUMENTS

| | | |
|---|---|---|
| 5,342,517 A | 8/1994 | Kopf |
| 5,593,580 A | 1/1997 | Kopf |
| 5,601,727 A | 2/1997 | Bormann et al. |
| 6,312,591 B1 | 11/2001 | Vassarotti et al. |
| 6,514,412 B1* | 2/2003 | Insley .................... B01D 61/18 |
| | | 210/321.83 |
| 6,837,995 B1 | 1/2005 | Vassarotti et al. |
| 2006/0060518 A1* | 3/2006 | Perreault ................ B01D 61/20 |
| | | 210/488 |
| 2008/0093298 A1* | 4/2008 | Browning ............. B01D 61/28 |
| | | 210/646 |
| 2011/0000840 A1 | 1/2011 | Kiene et al. |
| 2016/0303514 A1* | 10/2016 | Tabayashi ............ B01D 63/103 |
| 2019/0184342 A1* | 6/2019 | Borenstein .......... A61M 1/1698 |

OTHER PUBLICATIONS

Extended European Search Report, European Application No. 19159491.0, dated Aug. 26, 2019, 11 pages.
Japanese Office Action, JP-2021-550097, dated Feb. 2, 2023, 8 pages, with English Translation.
European Patent Office, Examination Report, Application No. 20704550.1, dated Jun. 26, 2023, 9 pages.
Japanese Office Action, JP-2021-550097, dated Aug. 30, 2022, 14 pages, with English Translation.

* cited by examiner

CROSSFLOW FILTER DEVICE

RELATED APPLICATIONS

This application is a 35 U.S.C. § 371 national phase application of PCT/EP2020/054265 (WO-2020-173762-A1), filed on Feb. 18, 2020, entitled "CROSSFLOW FILTER DEVICE", which application claims the benefit of EP Patent Application No. 19159491.0, filed Feb. 26, 2019, each of which are incorporated herein by reference in entirety.

FIELD OF THE PRESENT DISCLOSURE

The present disclosure relates to the field of crossflow filter devices for filtering pressurised feed liquids.

BACKGROUND

Crossflow filtration is a process in which a pressurised feed liquid is forced to flow tangentially over a membrane permeable to a filtrate derivable from the feed liquid. As the feed liquid flows over one side of the membrane, the filtrate passes through to the other side of the membrane, leaving behind a retentate liquid, which is the feed liquid depleted of filtrate. Media in the feed liquid that do not pass through the membrane are thus concentrated in the retentate liquid.

Typically, the feed liquid flows in a cyclic manner into a crossflow filter device, over the membrane, and out again, with the media concentrating in the retentate liquid with each such cycle. The filtrate which has passed through the membrane exits the device through an outlet on the opposite side of the membrane. A flow restrictor at the retentate outlet is used to create pressure within the device.

Example devices are the Vivaflow 500™, Vivaflow 50 R™ and Vivaflow 200™ available from Sartorius.

The Vivaflow 50 R™ is formed as a cassette which has rigid, clear plastic, retentate-side and filtrate-side plates. These plates are thick enough to resist the stresses produced by the pressure of throughflowing liquids and are bolted together around their perimeters. The cassette housing thus-formed sealingly contains a flow channel for the feed liquid/retentate liquid, a permeable membrane, and a plate-like, porous support body which supports the membrane while allowing relatively unimpeded passage therethrough of liquids, such as the filtrate. The cassette further features an inlet in the retentate-side plate for the feed liquid to the flow channel, an outlet in the retentate-side plate for the retentate liquid from the flow channel, and a further outlet in the filtrate-side plate for the filtrate which has passed through the membrane and the support body. The flow channel shuttles back and forth over the retentate surface of the membrane, which helps to expose all the feed liquid to a large surface area of the membrane, and also introduces a convoluted path to create eddies and break up linear flow of the feed liquid, thus improving the filtration efficiency of the cassette.

In the Vivaflow 50 R™, the flow channel is formed as a recess in the inner surface of the retentate-side plate. When the cassette is assembled, the retentate-side plate, membrane, support body and filtrate-side plate are stacked in that order, and the retentate-side and filtrate-side plates are then bolted together. As a result, the raised parts of the inner surface of the retentate-side plate which are outside the recess press against the membrane, and the front-to-back depth of the flow channel is just the depth of the recess. However, this arrangement, while being convenient to manufacture and confining the flow path of the feed liquid to the flow channel, allows some of the feed liquid to short-circuit the shuttling flow channel due to an incomplete seal being formed between the raised parts of the inner surface of the retentate-side plate and the membrane. Such short-circuiting impairs the filtration efficiency of the Vivaflow 200™.

The Vivaflow 200™ performs in the same way as the Vivaflow 50 R™, but a difference being that the feed inlet splits the fluid and directs across the retentate surfaces of two membranes rather than one. The two membranes sandwich a filtrate collection chamber containing the porous support body, so that filtrate enters from both sides rather than one. A benefit of this is that a larger membrane surface area is achieved, increasing filtration speed whilst minimising the overall device size.

The Vivaflow 50™ is a similar, but smaller, crossflow filter device, also available from Sartorius. It performs the same function as the Vivaflow 50 R™ and Vivaflow 200™ but has some constructional differences. For example, its retentate-side and filtrate-side plates are wedged into a thick plastic sleeve to press them together, and are sealed to each other with a perimeter O-ring.

A need exists for a crossflow filter device that reduces or avoids such short-circuiting.

SUMMARY

According to a first aspect of the invention, there is provided a crossflow filter device for filtering a pressurised feed liquid;

wherein the crossflow filter device comprises: a filter membrane; a flow channel for the pressurised feed liquid which extends in a path over a retentate surface of the membrane such that the direction of flow in the channel is tangential to the retentate surface, and a filtrate derived from the feed liquid passes through the membrane leaving retentate liquid in the flow channel; and a collection chamber for the filtrate formed on an opposite, filtrate surface of the membrane;

wherein the crossflow filter device further comprises a sealed housing having a retentate side and a filtrate side which enclose therebetween the flow channel, the filter membrane and the collection chamber; and wherein the crossflow filter device further comprises, flow channel guide walls provided at an inner surface of the retentate side of the housing, which guide walls are configured to form a fluid tight seal with the filter membrane and thereby define the path of the flow channel over the retentate surface of the membrane.

Advantageously, by providing guide walls which are configured to form a fluid tight seal with the filter membrane, the guide walls can provide effective sealing around the edges of the flow channel, and thereby substantially eliminate short-circuiting of the flow channel by the feed liquid.

The crossflow filter device of the first aspect may have any one or any combination of the following optional features.

According to one approach, the flow channel guide walls may be resiliently deformable. They can then deform and sealingly engage with the filter membrane to form the fluid tight seal. Advantageously, by providing guide walls which deform and sealingly engage on contact with the filter membrane, the guide walls can accommodate and seal to different types of membrane, such that different types of membrane can be used in the same basic device.

Conveniently, the resiliently deformable flow channel guide walls may be formed of elastomer, such as thermoplastic poly-urethane (TPU), natural rubber, silicone rubber, polysiloxane, or latex. The guide walls may have a single component structure, or a multi-component structure, for example a multilayer structure having layers formed of different materials such as different ones of the aforementioned elastomers.

The resiliently deformable guide walls may be a separate component of the device from the housing, and therefore should be correctly presented thereto on assembly of the device. Conveniently, the inner surface of the retentate side of the housing may include a recess corresponding to the line of the guide walls and in which the resiliently deformable guide walls locate to sealingly engage with that inner surface. The recess can help to correctly position the guide walls on assembly of the device. Particularly if the guide walls are a snug fit in the recess, it may also help to improve the seal between the guide walls and the inner surface of the retentate side of the housing.

Another option, however, is for the resiliently deformable guide walls to be permanently co-moulded into the retentate side of the housing during manufacture of these parts of the device. In this way, the guide walls become integral to the housing, and any problems of sealing the guide walls to the retentate side of the housing are avoided.

The crossflow filter device comprising the resiliently deformable guide walls may further comprise one or more interconnecting members which extend across a cavity, preferably outside the path of the flow channel, to join the inner surface of the retentate side of the housing to an inner surface of the filtrate side of the housing and thereby strengthen the housing. The interconnecting members may penetrate through openings in the membrane and, in devices comprising a foraminous support body (discussed below), may also penetrate through openings in the support body. The interconnecting members can strengthen the housing against the pressure of the throughflowing liquid, and thus allow the thickness of the housing to be reduced. This in turn can help to reduce manufacturing costs.

The interconnecting members may, for example, be integrally formed as projections from the inner surface of one of the retentate and filtrate sides of the housing. They may be joined to the inner surface of the other side using any convenient process, such as ultrasonic welding. Another option, however, is for the interconnecting members to be integrally formed as pairs of projections from the inner surfaces of respectively the retentate and filtrate sides of the housing, each pair of projections meeting at the membrane. In this case, there may be no need for the interconnecting members to penetrate through openings in the membrane, i.e. each interconnecting member can be formed by a given pair of projections and a small region of membrane trapped therebetween.

According to another approach, the guide walls may be welded to the filter membrane, the weld locally densifying the filter membrane across its entire thickness to form the fluid tight seal. For example, the weld can be formed by ultrasonic welding. As long as the membrane can be densified by welding, this option also allows the guide walls to seal to different types of membrane, such that different types of membrane can again be used in the same basic device.

When the guide walls are welded to the filter membrane, the device may further comprise weld support members which extend from an inner surface of the filtrate side of the housing to support the welds. In particular, the weld support members may also be welded to the filter membrane. The welded guide walls and weld support members, as well as forming the fluid tight seal, can also help to strengthen the housing in the manner of the interconnecting members discussed above. In devices comprising a foraminous support body (discussed below), the weld support members may penetrate through openings in the support body. Conveniently the guide walls can be integrally formed with the retentate side of the housing and/or the weld support members can be integrally formed with the filtrate side of the housing.

The guide walls may be configured such that the path for the flow channel shuttles back and forth over the retentate surface of the membrane. This improves filtration efficiency by forcing all the feed liquid to pass over a large area of the membrane, and helps to create eddies and turbulence to break up linear flow.

The device may further comprise: an inlet to the flow channel for the feed liquid; an outlet from the flow channel for the retentate liquid; and an outlet from the collection chamber for the filtrate. In use, external tubes are typically attached to the device at the inlet and outlets, for example such that an external pump can cycle the feed liquid and retentate liquid through the device. Conveniently, the inlet to the flow channel and the outlet from the flow channel may be formed in the retentate side of the housing, and the outlet from the collection chamber may be formed in the filtrate side of the housing.

One or more of the inlet and the outlets may include a respective rotating Luer cuff for connection to respective external tubing.

The device may further comprise a foraminous support body located within the collection chamber, the support body providing mechanical support to the membrane while allowing relatively unimpeded passage therethrough of the filtrate, e.g. to a filtrate outlet. The support body may be made, for example, of porous plastic. It may be manufactured by sintering plastic particulate. However, other materials and/or manufacturing processes can be used. As an alternative to such a support body, protuberances integrally formed with the housing may project from an inner surface of the filtrate side of the housing to support the membrane, the protuberances allowing relatively unimpeded passage therebetween of the filtrate.

The housing may be formed of transparent material. This allows the operation of the device to be visually monitored by a user. Conveniently, it can be formed of plastic material. However other types of material, such as glass, ceramic or metal may be used for the housing.

The retentate side and filtrate side of the housing may be formed as respective plates which sandwich the flow channel guide walls, the filter membrane and the foraminous support body (if present) therebetween. In particular, the housing may have a retentate-side plate and a filtrate-side plate which are sealed together along respective sealing perimeters to form a cavity therebetween in which the guide walls, the filter membrane, and the foraminous support body (if present) are housed. An O-ring may be provided around the sealing perimeters to perfect the seal therebetween. The plates may be sealed together by various means, for example: ultrasonic welding, heat staking; gluing; or mechanical interference. The joining of the plates may be performed or supplemented by mechanical fasteners (e.g. screws, bolts, staples, clamps etc.), integral snap-fit connectors, and/or a wedge-fit mechanism. Another option is that the sealed housing further includes a moulded or overmoulded surround which joins the casings together.

The device may further comprise complimentary formations located on opposing sides of the device and configured such that a formation on one side of a device can engage with the complimentary formation on the other side of another device such that plural devices can be joined together in a larger grouping. For example, the complimentary formations may include a pair of male and female formations such as a rail and a groove. The devices of such a larger grouping may be fluidly connected in parallel or in series to process larger volumes of feed liquid.

The device may further comprise external support feet projecting from the filtrate side of the housing. When the feet are placed on a work surface (e.g. laboratory bench), the device is thereby raised from the surface giving improved access to e.g. its inlet and the outlets and particularly any rotating Luer cuff. Also by having the feet project from the filtrate side of the housing, the collection chamber will be below the filter membrane such that gravity can assist the passage of filtrate through the membrane.

The device may be sterile, e.g. to a sterility assurance level of at least $10^{-3}$ and preferably of at least $10^{-6}$. Typical methods for sterilising the device include ethylene oxide gas and radiation. Sterility assurance levels can be validated according to an appropriate standard such as ISO 11135: 2014 for ethylene oxide gas and ISO 11137:2006 for radiation. Advantageously, the device can be configured to reduce trapping areas and improve the effectiveness of the chosen sterilisation processes, in particular in the region of the inlet and outlets. Using ultrasonic welding to join parts of the device is also generally beneficial for promoting sterility as this joining process does not require the use of fixtures, fasteners, adhesives or other components that could compromise sterility.

The device may be a dual membrane device having a second filter membrane and corresponding flow channel and flow channel guide walls on an opposite side of the collection chamber, i.e. so that the collection chamber is sandwiched between first and second filter membranes, with filtrate passing through each of the membranes into the collection chamber. The retentate side of the sealed housing thus becomes a first retentate side, while the filtrate side of the housing becomes a second retentate side. Typically, the foraminous support body is located within the collection chamber of such a device.

Optional features discussed above pertain also to corresponding features of this dual membrane device. Conveniently, when the device comprises the one or more interconnecting members, these may penetrate through openings in the first and second membranes and, typically, the foraminous support body. The inlet for feed liquid may be a single inlet that feeds liquid to both flow channels. The outlet for retentate liquid may be a single outlet that receives retentate liquid from both flow channels.

BRIEF DESCRIPTION OF THE DRAWINGS

Embodiments of the present disclosure will now be described by way of example with reference to the accompanying drawings in which.

DETAILED DESCRIPTION

Figure 1:
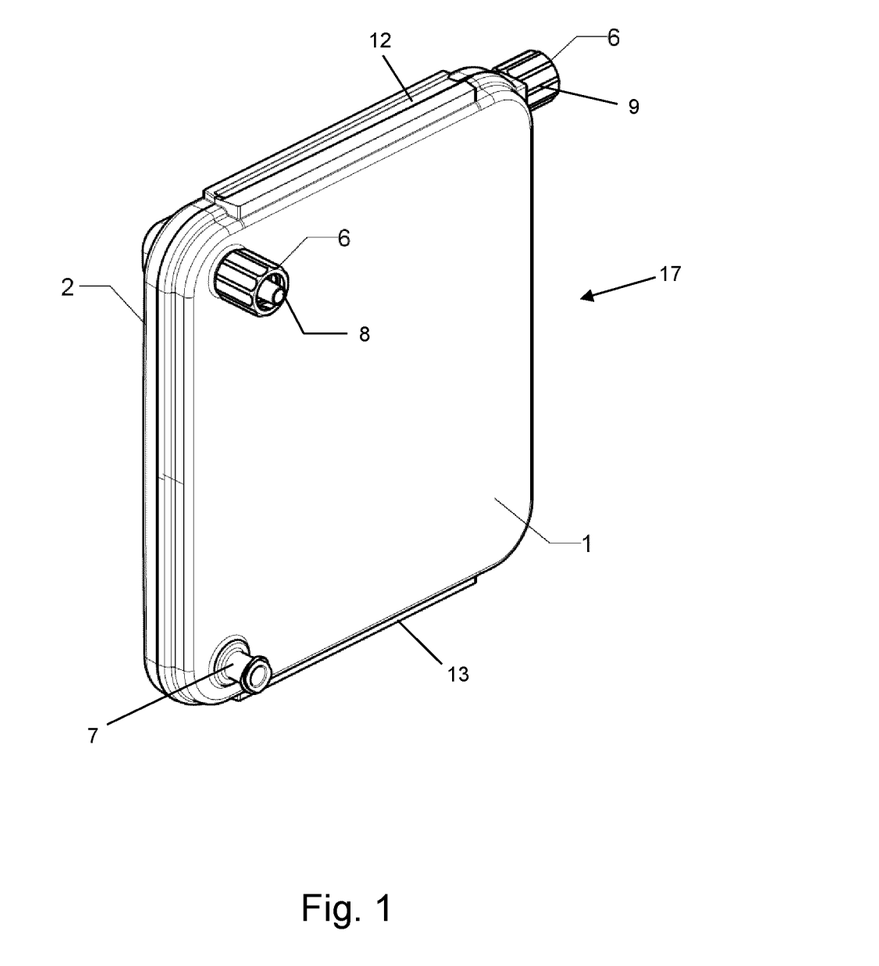
FIG. 1 shows a perspective view of a sealed housing of a crossflow filter device.

FIG. 1 shows a perspective view of a sealed housing of a crossflow filter device 17, the housing comprising a retentate-side plate 1 and a filtrate-side plate 2 which define a cavity therebetween. An inlet 7 for flow of a feed liquid into the cavity is formed in the retentate-side plate 1, an outlet 8 for flow of a retentate liquid 8 out of the cavity is formed in the retentate-side plate 1, and an outlet 9 for a flow of filtrate out of the cavity is formed in the filtrate-side plate 2.

The feed liquid inlet 7 has a female Luer connection, while the retentate liquid outlet 8 and the filtrate outlet 9 each has a male Luer connection with a respective rotating Luer cuff 6. The Luer connections allow external tubing connectors to be attached to the device 17.

Figure 2:
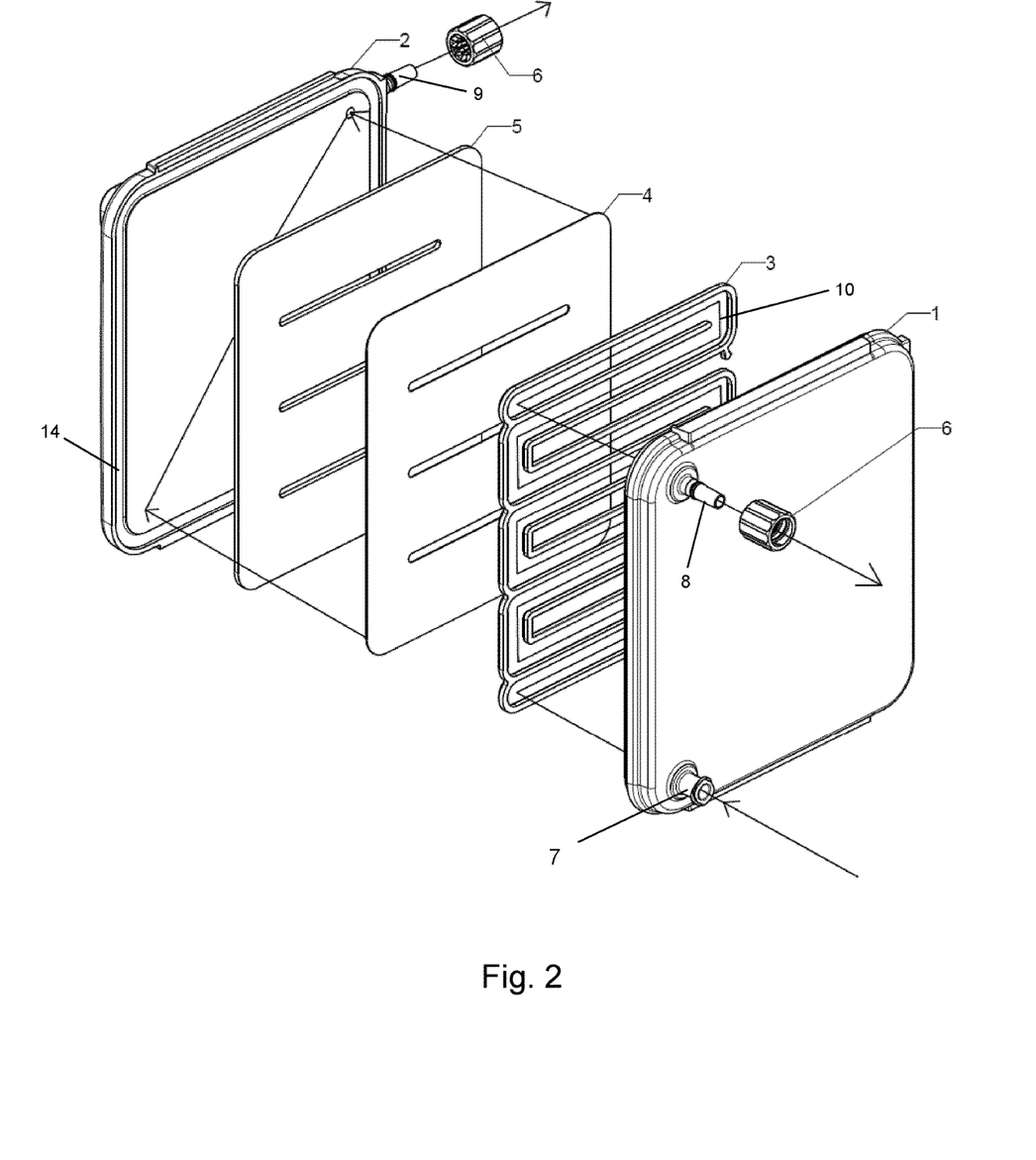
FIG. 2 shows a first exploded view of the crossflow filter device of FIG. 1.
Figure 3:
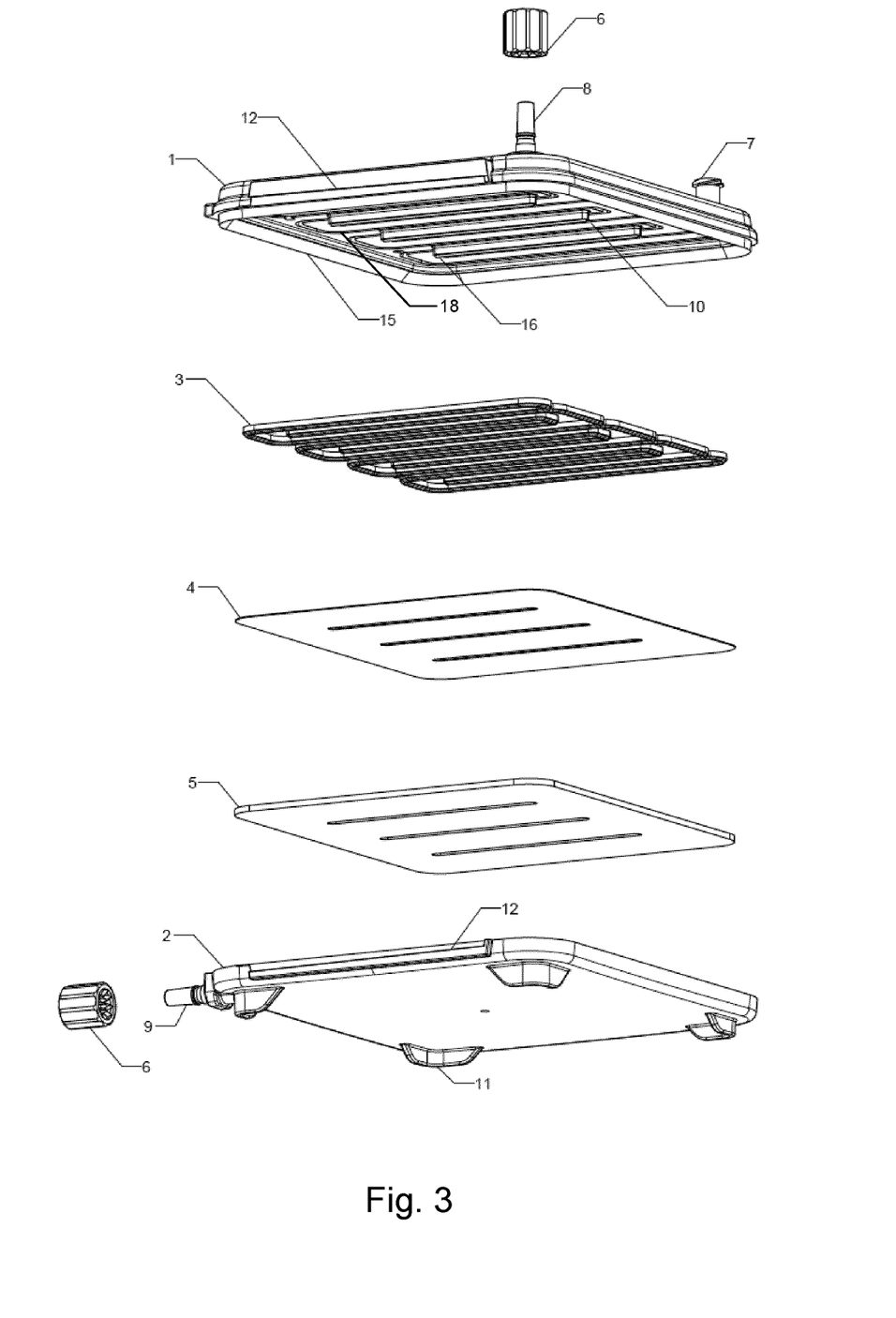
FIG. 3 shows a second exploded view of the crossflow filter device of FIG. 1.
Figure 4:
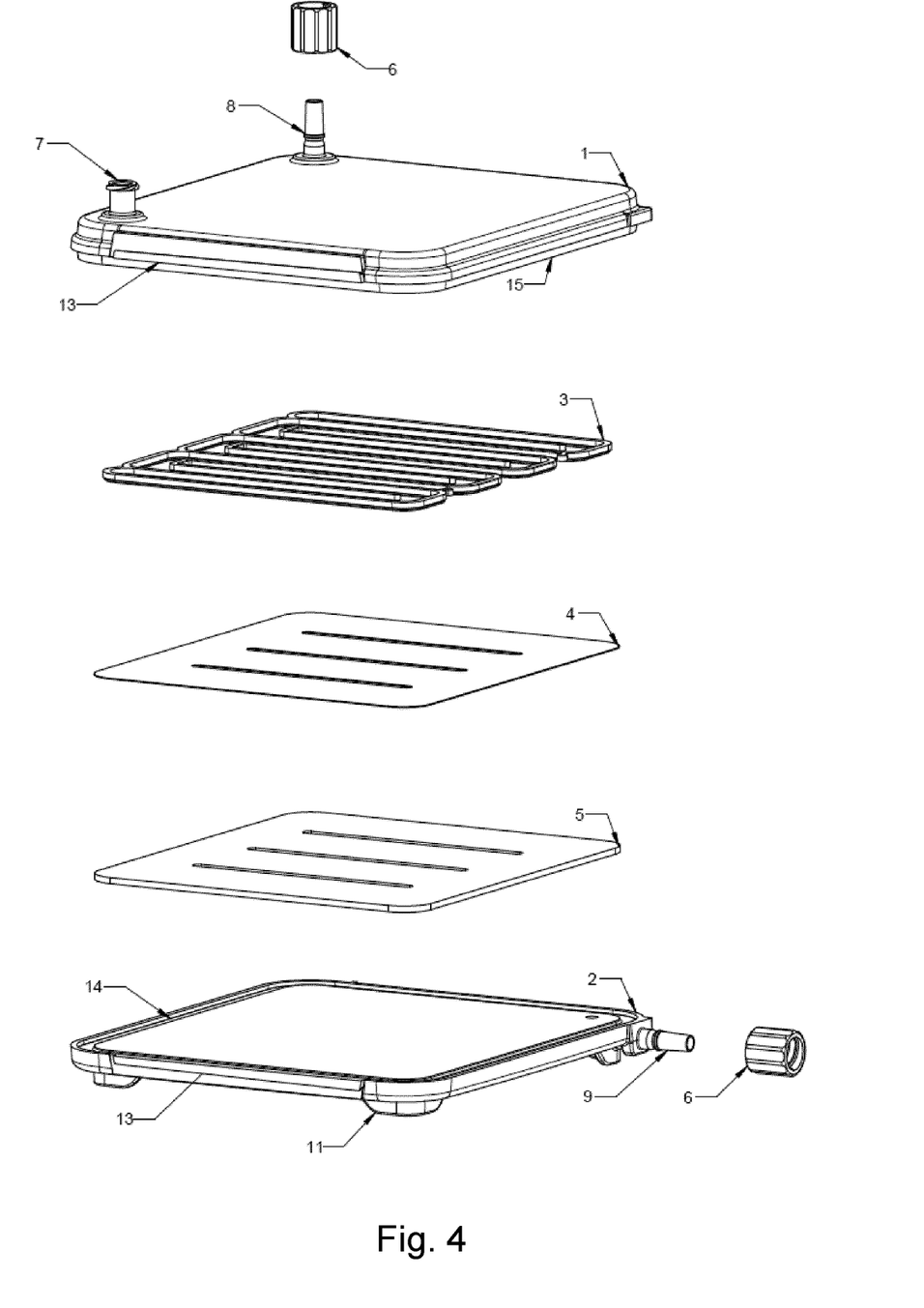
FIG. 4 shows a third exploded view of the crossflow filter device of FIG. 1.

FIGS. 2 to 4 are respective exploded views of the crossflow filter device 17 of FIG. 1. FIGS. 2 and 4 allow the inner surface of the filtrate-side plate 2 to be seen, while FIG. 3 allows the inner surface of the retentate-side plate 1 to be seen. The housing plates 1, 2 are formed as respective square plates, and sandwich therebetween, in order from the retentate side to the filtrate side: resiliently deformable flow channel guide walls 3, a filter membrane 4, and a foraminous support body 5. The plates 1, 2 are joined together around their respective perimeters, as discussed in more detail below, to form a sealed module. Conveniently, the plates 1, 2 may be formed of rigid, transparent plastic material.

The guide walls 3 (best shown in FIG. 2) are formed as a single piece elastomer moulding which, when engaged on one side with the inner surface of the retentate-side plate 1 and on the other side with the filter membrane 4, defines the path of a flow channel 10 which shuttles back and forth over the retentate surface of the membrane 4 from the inlet 7 to the outlet 8. To assist with the correct location of the guide walls 3 in the device 17, the inner surface of the retentate-side plate 1 has a recess 18 formed therein (shown in FIG. 3), corresponding to the line of the guide walls 3 and into which the walls can be fitted. Alternatively, the guide walls 3 can be co-moulded to the retentate-side plate 1 such that the two parts are permanently integrated.

The guide walls 3 are made of a medically-safe elastomer, such as TPU, natural rubber, silicone rubber, polysiloxane, or latex, which is highly resistant to leaching. This lowers or avoids any risk of contamination of filtrates and feed liquids/retentates flowing through the device 17. The guide walls 3, being elastically compliant, adapt to and accommodate any irregularities in the retentate surface of the filter membrane 4, forming a good seal around the edges of the flow channel 10. They thus substantially prevent any short-circuiting of the flow channel 10 by liquid on the flow path 10 from the inlet 7 to the outlet 8. In addition, they can adapt to different types of membrane 4 (such as poly ether sulfone membranes, regenerated cellulose membranes, or cellulose acetate membranes), and can help to prevent damage to any surface treatment of the membrane 4, such as specialised receptors attached to the membrane). Thus the same basic filter device can be used in many different applications, simply by changing the membrane type. In particular, the device 17 can be used to scale-up or scale-down laboratory bench filtration, e.g. for the production of biopharmaceuticals such as antibodies.

The foraminous support body 5 fills a collection chamber for the filtrate created by that part of the housing cavity between the membrane 4 and the inner surface of the filtrate-side plate 2. The support body 5 physically supports the membrane 4 over substantially its entire area, allowing a pressure difference to be established across the membrane 4 that drives the flow of filtrate therethrough. The fora on the body 5 are formed such that filtrate can pass through it relatively unimpeded en route from the membrane 4 to the outlet 9 via the collection chamber. Conveniently, the body 5 can be a porous plastic body formed by sintering plastic particulate.

In use, external tubing attached to the feed liquid inlet 7 and the retentate liquid outlet 8 are joined to an external pump. Further external tubing attaches to the filtrate outlet 9 and extends to a collection vessel. The pump continuously circulates a feed liquid into the device via the inlet 7, along the flow channel 10 defined by the guide walls 3, and back to the pump as retentate liquid from the outlet 8. The direction of flow of the liquid in the flow channel 10 is tangential to the retentate surface of the membrane 4, and the pressure differential across the membrane 4 drives the flow of the filtrate derived from the feed liquid through the membrane 4. A flow restrictor (not shown) at the retentate outlet 9 is used to create the pressure within the device 17.

Figure 5:
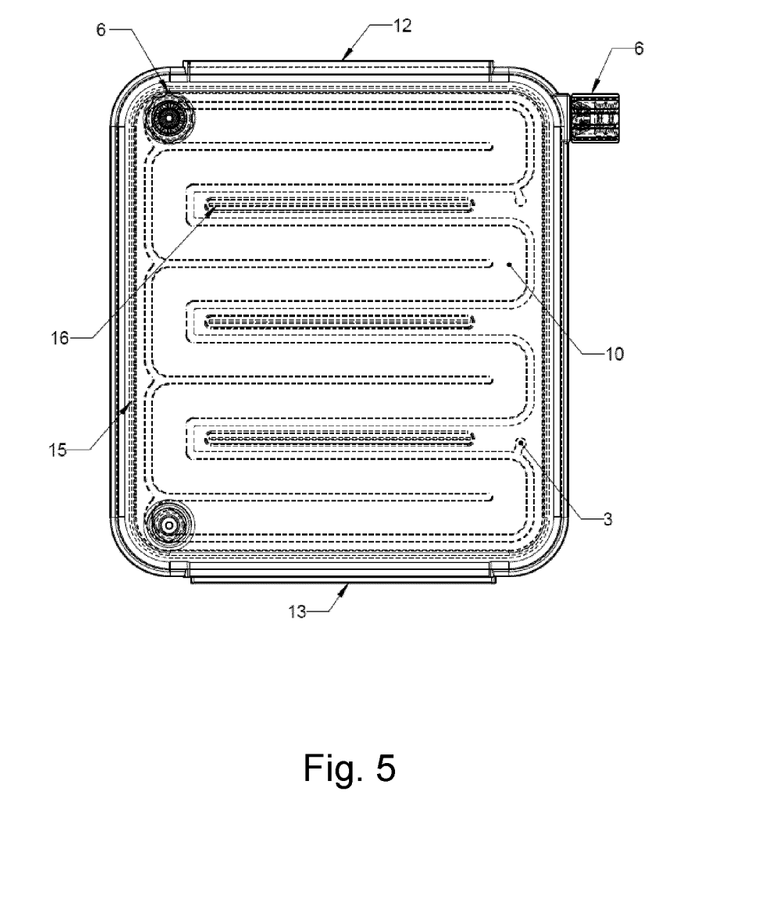
FIG. 5 shows a plan view of the crossflow filter device of FIG. 1.

The shuttling back and forth of the flow channel 10 forces all of the feed liquid to pass over a large surface area of the retentate surface of the membrane 4. It also creates eddies and turbulence in the feed liquid, which break up linear flow thereof. More specifically, the path of the flow channel 10 is comprised of a series of consecutive, anti-parallel linear runs that span a width of the membrane 4 and are connected by successive 180° degree turns. FIG. 5 is a plan view of the crossflow filter device 17, with internal features indicated by dashed lines, and best shows the path of the flow channel 10.

A result of operating the device is therefore that, as the pump circulates the feed liquid, filtrate derived from the feed liquid passes through the foraminous support body to collect in the collection vessel attached to the filtrate outlet 9, and media in the feed liquid that do not pass through the membrane 4 concentrate in the retentate liquid.

To form the housing, the housing plates 1, 2 may be sealed together along a perimeter groove 14 of one of the plates (in this example the filtrate-side plate 2, as shown in FIGS. 2 and 4) and a corresponding perimeter ridge 15 of the other plate, (in this example the retentate-side plate 1, as shown in FIG. 3). The ridge 15 fits into the groove 14 and acts as an energy director allowing the plates 1, 2 to be ultrasonically welded together around their perimeters. This seals the cavity in which the guide walls 3, filter membrane 4, and support body 5 are located, with a suitable spacing between the plates 1, 2 so that the guide walls 3 properly engage with the filter membrane 4 and the inner surface of the retentate-side plate 1. Due to their deformability, the guide walls 3 allow variation in the stand-off between the filter membrane 4 and the inner surface of the retentate-side plate 1.

However, to control this standoff, while also strengthening the housing against the pressures which it experiences in operation, interconnecting members 16 may be provided to physically link the inner surfaces of the housing plates 1, 2. The interconnecting members 16 penetrate, outside the path of the flow channel 10, through dedicated openings in the membrane 4 and in the support body 5. For example, the interconnecting members 16 can be formed as projections from the inner surface of one of the plates (in this example, the retentate-side plate 1), and on assembly of the device 17 can be joined to the inner surface of the other plate (in this example, the filtrate-side plate 2) by a suitable joining process. Conveniently, the interconnecting members 16 can act as further energy directors, allowing them to be ultrasonically welded to the other plate. By strengthening the housing, they allow the housing plates to be manufactured from thinner material than would otherwise be the case.

The filtrate-side plate 2 has external feet 11 (shown in FIGS. 3 and 4) at each of its corners on which the device 17 can rest. When the feet 11 are placed on a work surface, the device 17 is supported such that the collection chamber lies directly below the membrane 4. This allows gravity to assist the flow of filtrate through the membrane 4. In addition, the feet 11 raise the level of the entire device so that the Luer cuff 6 for the outlet 9 can be rotated unimpeded.

Opposite edges of the housing have respectively a mounting groove 12 and a mounting rail 13. These are configured such that the mounting groove 12 of one device 17 can engage with the mounting rail 13 of a second device 17, allowing a number of devices 17 to be joined together in a larger grouping, and then fluidly connected in series or in parallel to increase the ability to filter larger volumes. Each of the mounting groove 12 and the rail 13 is partly formed by one of the plates 1, 2 and partly by the other plates 1, 2.

The device may be produced as sterile, with typical sterilisation methods including ethylene oxide gas and radionuclide, X-ray or electron beam radiation.

Figure 6:
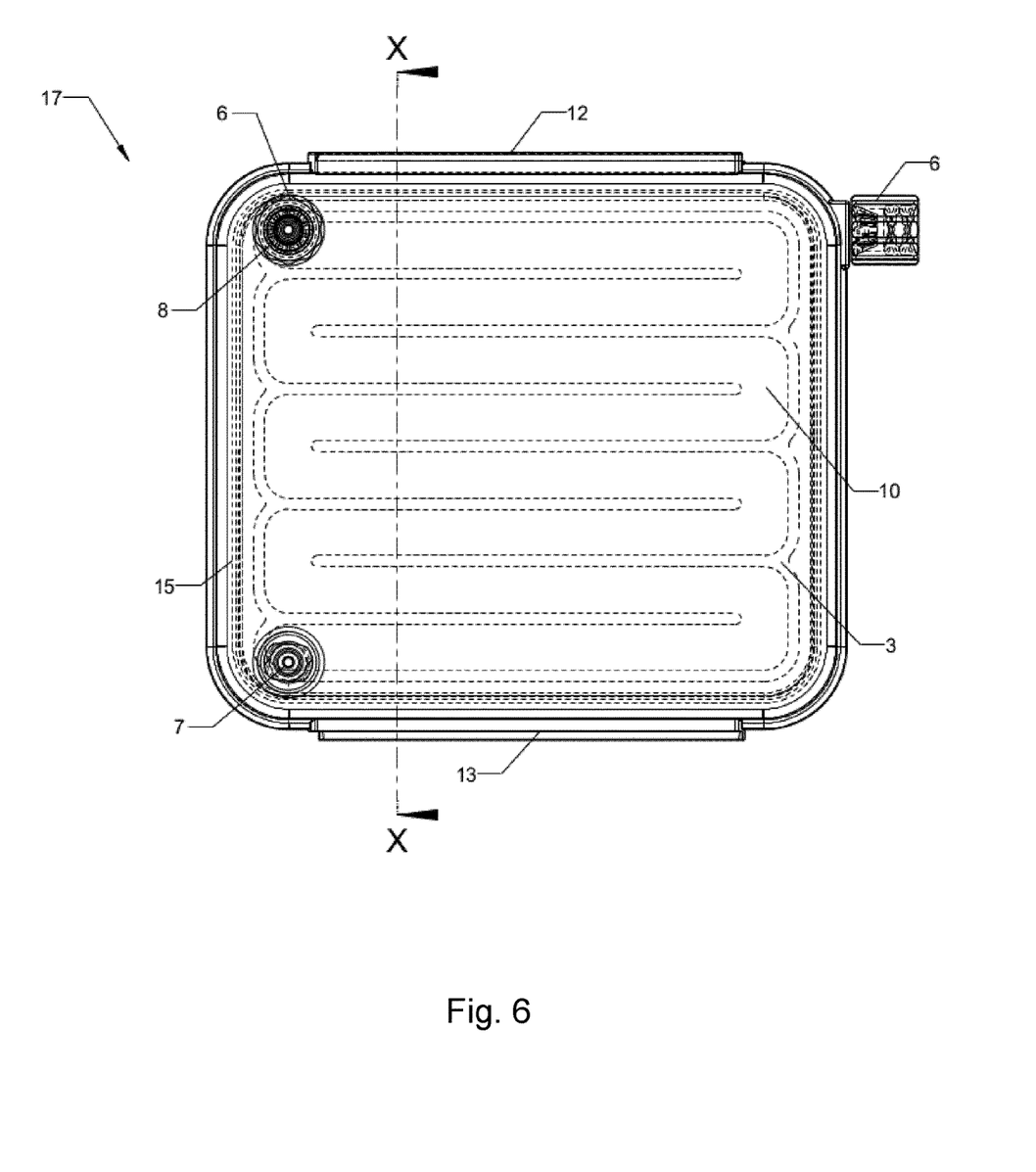
FIG. 6 shows a plan view of a variant crossflow filter device.
Figure 7:
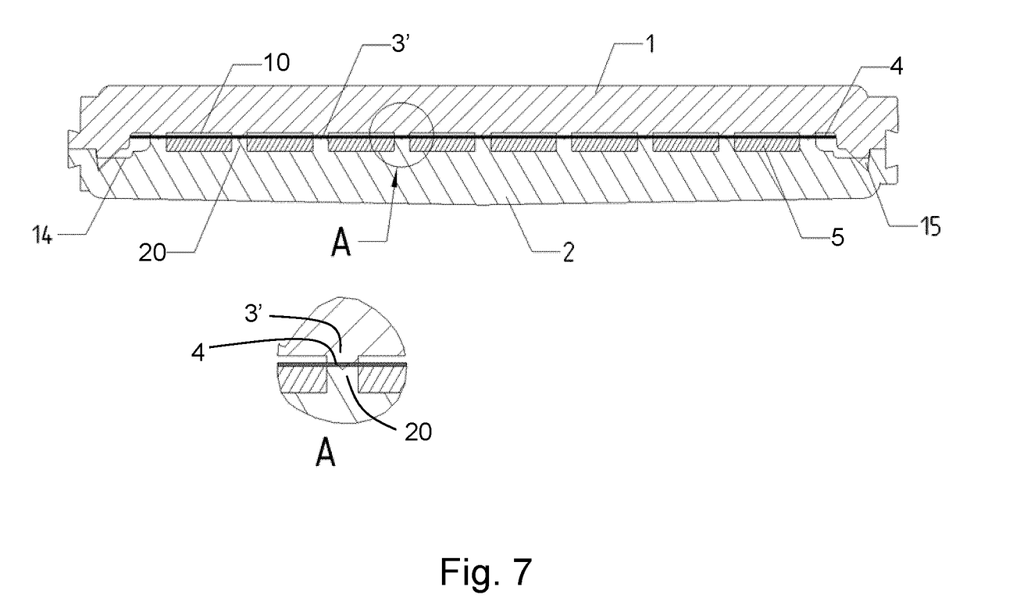
FIG. 7 shows a cross-section through the variant device along the line X-X of FIG. 6.

FIG. 6 shows a plan view of a variant of the crossflow filter device 17, again with internal features indicated by dashed lines, and FIG. 7 shows a cross-section through the variant device along the line X-X. Features common to the variant device and the device of FIGS. 1 to 5 have the same reference numbers.

Instead of the resiliently deformable flow channel guide walls 3, the variant device has rigid plastic guide walls 3' to define the path of the flow channel 10. The walls are part of the moulding that also forms the retentate-side plate 1, and are permanently ultrasonically welded to the filter membrane 4. This welding locally densifies the membrane across its full thickness to form a fluid tight seal which prevents any short-circuiting of the flow channel 10 by liquid on the flow path 10 from the inlet 7 to the outlet 8.

To support the welds, support walls 20 project from the inner surface of the filtrate side plate 2 across the collection chamber and mirroring the line of the guide walls 3'. Conveniently, these support walls are part of the moulding that also forms the filtrate-side plate. The support walls penetrate through corresponding openings in the support body 5 and are also permanently joined to the filter membrane 4 by the ultrasonic welding. FIG. 7 shows a magnified view A of the cross-section at one of the welds, Advantageously, the support walls 20, in combination with the guide walls 3', strengthen the housing in the same manner as the interconnecting members 16 of the device of FIGS. 1 to 5.

FIGS. 8 to 11 show cross-sections and isometric views of parts of second and third variant crossflow filter devices. As before, features common to the second and third variant devices and the devices of FIGS. 1 to 7 have the same reference numbers.

Figure 8:
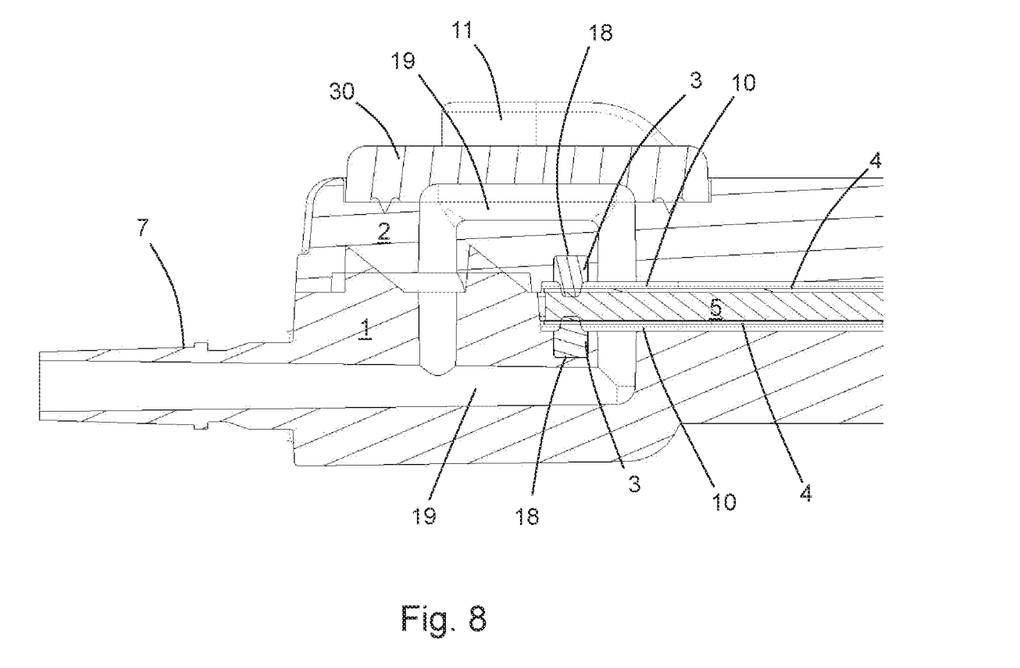
FIG. 8 shows a cross-section through a part of a second variant crossflow filter device.

The variant of FIG. 8 is a dual membrane device in which first and second filter membranes 4 sandwich opposite sides of the support body 5. In this way filtrate enters the collection chamber from both sides rather than just one to increase filtration speed whilst maintaining essentially the same overall device size.

Conveniently, the dual device has a single inlet 7 (and a corresponding single retentate outlet—not shown) which feeds liquid to the flow channels 10 of both membranes 4. The inlet 7 extends in the plane of the device from one of the housing side plates 1, with passages 19 being moulded into both housing side plates 1, 2 to bring the liquid from the inlet to the flow channels on either side of the support body 5. To facilitate formation of the passage 19 during moulding of the side plate 2 which does not have the inlet, the plate 2 is moulded with its passage 19 open to the external face of the plate. The passage is thereafter closed off on the external face beneath a separately moulded cover piece 30.

Figure 9:
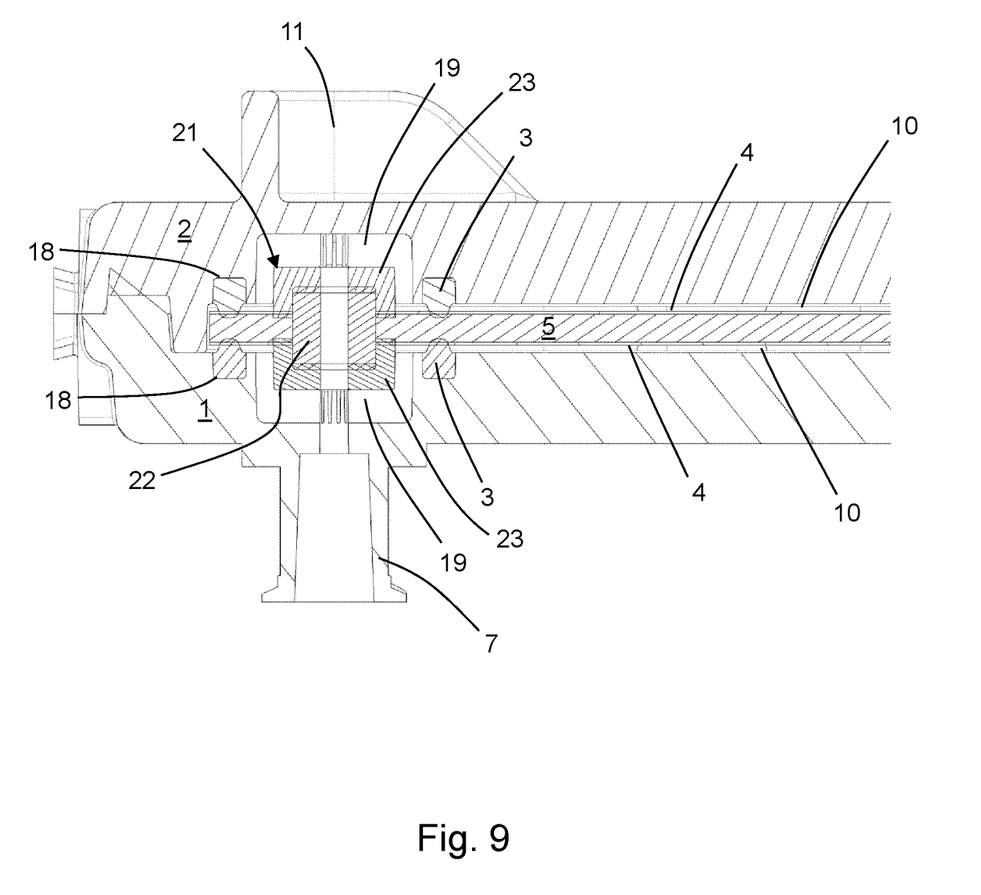
FIG. 9 shows a cross-section through a part of a third variant crossflow filter device.
Figure 10:
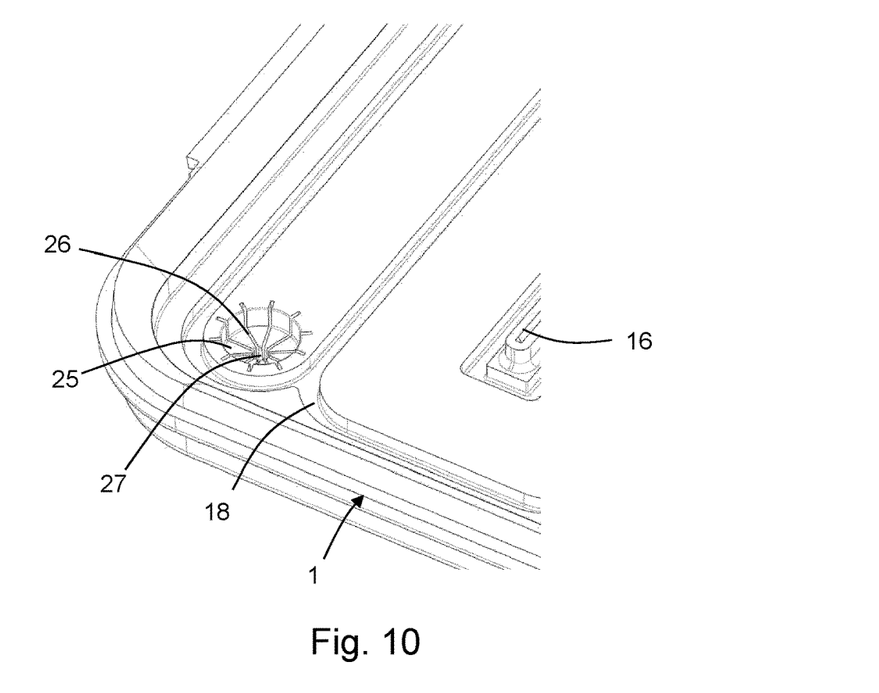
FIG. 10 shows detailed isometric view of the inner surface of one of the side plates of the third variant crossflow filter device of FIG. 9.
Figure 11:
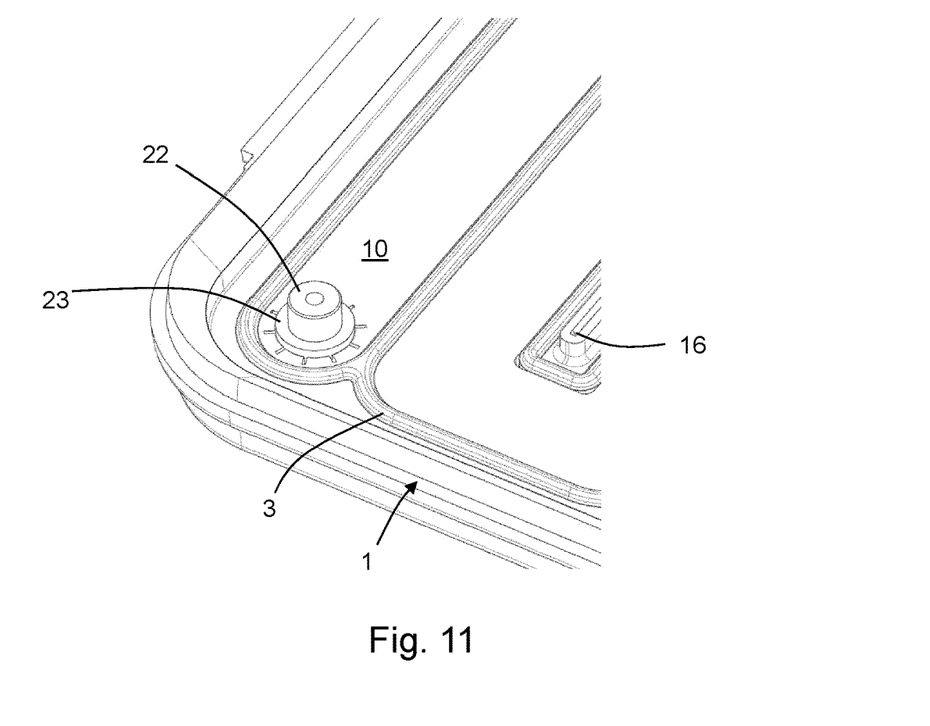
FIG. 11 shows the detailed isometric view of FIG. 10 with part of a flow distributor and channel guide walls located on the side plate.

The variant of FIGS. 9 to 11 is a further dual membrane device. It differs from the device of FIG. 8 in that the inlet 7 extends perpendicularly to plane of the device from one of the housing side plates 1. Again passages 19 are created in both side plates 1, 2 to bring the liquid from the inlet to the flow channels 10 of both membranes 4. In this variant, however, the passages are formed by moulding matching recesses 25 in the inner surfaces of both side plates, as shown in FIG. 10, and providing apertures in the membranes 4 and the support body 5 which are aligned with these recesses. A distributor body 21 extends through the apertures and at each end into the matching recesses. This body has a central bushing 22 with an axial hole to allow liquid to pass from side-to-side across the device, and also has sealing caps 23 on both ends of the bushing which seal on each side of the distributor body to the respective filter membrane 4 to prevent liquid leaking through the aligned membrane apertures and thereby bypassing the membranes themselves.

The passages 19 are formed by respective arrays of slits 26 which radiate outwardly from central wells 27 formed in the bases of the recess 25 to provide fluid communication between the ends of the axial hole of the bushing 22 and the flow channels 10. The sealing caps 23 of the distributor body 21 are sandwiched between the bases of the recess 25 to hold the body in place. The bushing 22 and one of the sealing caps 23 (for example shown in FIG. 11) can be formed by co-moulding. However, the other sealing cap 23 (not shown in FIG. 11), can only be fitted to the bushing after it has been inserted through the aligned apertures of the membranes 4 and the support body 5.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A crossflow filter device for filtering a pressurised feed liquid;
wherein the crossflow filter device comprises: a filter membrane; a flow channel for the pressurized feed liquid which extends in a path over a retentate surface of the membrane such that the direction of flow in the channel is tangential to the retentate surface, and a filtrate derived from the feed liquid passes through the membrane leaving retentate liquid in the flow channel; and a collection chamber for the filtrate formed on an opposite, filtrate surface of the membrane;
wherein the crossflow filter device further comprises a sealed housing having a retentate side and a filtrate side which enclose therebetween the flow channel, the filter membrane and the collection chamber; and
wherein the crossflow filter device further comprises flow channel guide walls provided at an inner surface of the retentate side of the housing,
wherein the flow channel guide walls, which are resiliently deformable, deform and sealingly engage with the filter membrane to form a fluid tight seal with the filter membrane and thereby define the path of the flow channel over the retentate surface of the membrane; and
wherein the inner surface of the side of the housing includes a recess corresponding to the line of the guide walls and in which the guide walls locate to sealingly engage with the inner surface of the retentate side of the housing.

2. The crossflow filter device according to claim 1 wherein the guide walls are permanently co-moulded into the retentate side of the housing.

3. The crossflow filter device according to claim 1 which further comprises one or more interconnecting members which extend outside the path of the flow channel to join the inner surface of the retentate side of the housing to an inner surface of the filtrate side of the housing and thereby strengthen the housing.

4. The crossflow filter device according to claim 3 wherein the interconnecting members penetrate through openings in the membrane.

5. A crossflow filter device for filtering a pressurised feed liquid;
wherein the crossflow ter device comprises: a filter membrane; a flow channel for the pressurized feed liquid which extends in a path over retentate surface of the membrane such that the direction of flow in the channel is tangential to the retentate surface, and a filtrate derived from the feed liquid passes through the membrane leaving retentate liquid in the flow channel; and a collection chamber for the filtrate formed on an opposite, filtrate surface of the membrane;
wherein the crossflow filter device further comprises a sealed housing a retentate side and a filtrate side which enclose therebetween the flow channel, the filter membrane and the collection chamber;
wherein the crossflow filter device further comprises flow channel guide walls provided at an inner surface of the retentate housing; and
wherein the guide walls are welded to the filter membrane, the weld locally densifying the filter membrane across its entire thickness to form a fluid tight seal with the filter membrane and thereby define the path of the flow channel over the retentate surface of the membrane.

6. The crossflow filter device according claim 5 wherein the device further comprises weld support members which extend from an inner surface of the filtrate side of the housing to support the welds.

7. The crossflow filter device according claim 6 wherein the weld support members are also welded to the filter membrane.

8. The crossflow filter device according to claim 1 wherein the guide walls are configured such that the path for the flow channel shuttles back and forth over the retentate surface of the membrane.

9. The crossflow filter device according to claim 1 wherein the housing includes: an inlet to the flow channel for the feed liquid; an outlet from the flow channel for the retentate liquid; and an outlet from the collection chamber for the filtrate.

10. The crossflow filter device according to claim 1 which further comprises a foraminous support body located within the collection chamber, the support body providing mechanical support to the membrane while allowing relatively unimpeded passage therethrough of the filtrate.

11. The crossflow filter device according to claim 1 wherein the housing has a retentate-side plate and a filtrate-side plate which are sealed together along respective sealing perimeters to form a cavity therebetween in which the guide walls and the filter membrane are housed.

12. The crossflow filter device according to claim 1 wherein the device further comprises complimentary formations located on opposing sides of the device and configured such that a formation on one side of a device can engage with the complimentary formation on the other side of another device such that plural devices can be joined together in a larger grouping.

13. The crossflow filter device according to claim 1 wherein the device further comprises legs situated on the sealed housing.

* * * * *